United States Patent [19]

Colarelli, III et al.

[11] Patent Number: 5,129,149
[45] Date of Patent: Jul. 14, 1992

[54] STAND-ALONE SIDESLIP METER

[75] Inventors: Nicholas J. Colarelli, III, University City; Paul G. Marting, Chesterfield, both of Mo.

[73] Assignee: Hunter Engineering Company, Bridgeton, Mo.

[21] Appl. No.: 518,036

[22] Filed: May 2, 1990

[51] Int. Cl.⁵ .............................................. G01B 5/24
[52] U.S. Cl. ...................................... 33/203.14
[58] Field of Search .................................. 73/118.1; 33/203.12-203.17

[56] References Cited

U.S. PATENT DOCUMENTS

| | | | |
|---|---|---|---|
| 1,487,759 | 3/1924 | Skinner | 33/203.14 |
| 1,665,161 | 4/1928 | Frazier | 33/203.14 |
| 1,883,180 | 10/1932 | Weaver | 33/203.14 |
| 1,890,218 | 12/1932 | Duby | 33/203.14 |
| 1,950,994 | 3/1934 | Musselman | 33/203.14 |
| 3,905,120 | 9/1975 | Butler | 33/203.14 |

FOREIGN PATENT DOCUMENTS

55-96435  7/1980  Japan .................. 73/118.1

*Primary Examiner*—R. Raevis
*Attorney, Agent, or Firm*—Polster, Lieder, Woodruff & Lucchesi

[57] ABSTRACT

A sideslip meter includes first and second parallel runways. The first runway has a measurement plate movable laterally with respect to the direction of travel of the vehicle along the runway as a tire of said vehicle passes over the measurement plate. A lateral movement sensor senses the amount of lateral movement of the measurement plate and provides a corresponding output signal. First and second switches are spaced along the first runway. Each switch is actuated by the passage of a vehicle tire so that passage of the vehicle causes first one and then the other of the switches to be actuated. A display is provided for displaying information concerning lateral movement of the measurement plate. A control circuit determines vehicle velocity and vehicle direction from the actuations of the first and second switches and inhibits the display if the velocity is too fast or too slow, or if the vehicle is going backwards over the runways. The control circuit, by keeping track of the switch closures, also determines whether the front axle or rear axle sideslip is being measured.

35 Claims, 5 Drawing Sheets

STAND-ALONE SIDESLIP METER

BACKGROUND OF THE INVENTION

This invention relates to vehicle alignment testing equipment, and more particularly to apparatus for checking sideslip.

As a vehicle, such as an automobile, rolls down the road, there should not be any lateral forces on the tires. When lateral forces are present, the not effect is the same as if the wheels were being dragged sideways as they roll down the road. Sideslip is a measure of the magnitude of these lateral forces. It is measured in units of feet/mile or meters/kilometer. For example, a sideslip measurement of twenty feet/mile means that if that vehicle were driven in a straight line for one mile, the tires would have been scuffed sideways a distance of twenty feet.

The largest influence on the sideslip measurement is total toe. As a result, a positive sideslip measurement generally reflects a toe-in condition and a negative sideslip measurement generally reflects a toe-out condition. Measuring sideslip, therefore, can quickly give the user an indication of alignment problems which should be checked further, particularly total toe.

Sideslip meters are known, but they could be improved. It is preferable that operation of sideslip meters be as automatic as possible, yet some units require that the user operate the controls several times during the process of measuring sideslip In this regard, it should be noted that sideslip is preferably a one-person test. The user should be able to set the machine, drive the vehicle under test over the meter, and then return to the meter to obtain the results.

Sideslip readings are subject to various parameters of the test, such as vehicle velocity and vehicle direction. Velocities which are too high or too low result in inaccurate sideslip readings. Similarly, sideslip measurements taken in the forward direction (front wheels of the vehicle passing over the meter first) generally differ (sometimes significantly) from measurements taken on the same vehicle traveling in the reverse direction.

Currently available meters are not believed to inform the user that the vehicle velocity was too fast or too slow. Instead, the meter simply gives the user an inaccurate reading, with no warning that the reading is inaccurate. Even if the currently available sideslip meters had some provision for informing the user of an inaccurate reading, they could still be improved. The user still might not know until he or she gets out of the vehicle and walks over to the control panel that the test was invalid because one of the parameters was not satisfied. The user would then have to walk back to the vehicle, and perform the test over again. This could happen several times It. would be preferable if the user could be informed, while still in the vehicle, that the test was unsuccessful.

Sideslip meters are generally used in an environment, the service bay, which is relatively hostile and often limited in space. It is preferred, therefore, that the meter be durable and as small as possible.

SUMMARY OF THE INVENTION

Among the various objects and features of the present invention may be noted the provision of a sideslip meter which accurately and reliably measures sideslip.

A second object is the provision of such a sideslip meter which automates much of the test so that a single individual may perform the test quickly and efficiently.

A third object is the provision of such a sideslip meter which reduces the need for the user to leave the vehicle until a successful sideslip measurement has been taken.

A fourth object is the provision of such a sideslip meter which is durable and requires little in the way of maintenance.

A fifth object is the provision of such a sideslip meter which is relatively small in size.

A sixth object is the provision of such a sideslip meter which informs the user that the vehicle velocity during the test fell outside of allowable limits.

Other objects and features will be in part apparent and in part pointed out hereinafter.

Briefly, in a first aspect of the present invention, a sideslip meter for detecting sideslip in a vehicle includes a sideslip measurement assembly having first and second generally parallel, spaced apart runways over which a vehicle may be driven The first runway has a measurement plate movable laterally with respect to the longitudinal axis of the first runway as a tire of the vehicle passes over the measurement plate. The measurement plate is moved laterally as a result of lateral forces acting upon the tire. A lateral movement sensor operatively connected to the measurement plate senses the amount of lateral movement of the measurement plate as a vehicle tire passes over the plate and provides an output signal corresponding to the amount of lateral movement. The sideslip measurement assembly also includes first and second switches disposed along one of the runways, the switches being spaced apart along that runway. Each switch is actuated by the passage of a vehicle tire thereby so that passage of the vehicle over the sideslip measurement assembly causes first one and then the other of the switches to be actuated. An indicator displays information concerning lateral movement of the measurement plate as measured by the lateral movement sensor. Control circuitry, operatively connected to the first and second switches and responsive to actuation thereof, determines a controlled parameter of the vehicle, such as vehicle velocity, from the actuations of the first and second switches. It compares the value of the controlled parameter with preset values to determine if the value of the controlled parameter is acceptable. And it inhibits display of the lateral movement information by the indicator if the value of the controlled parameter is unacceptable.

In a second aspect of the present invention, a sideslip meter for detecting sideslip in a vehicle includes a sideslip measurement assembly having first and second generally parallel, spaced apart runways over which a vehicle may be driven. The first runway has a measurement plate movable laterally with respect to the longitudinal axis of the first runway as a tire of the vehicle passes over the measurement plate, the measurement plate being moved laterally as a result of lateral forces acting upon the tire. A lateral movement sensor operatively connected to the measurement plate senses the amount of lateral movement of the measurement plate as a vehicle tire passes over the plate and provides an output signal corresponding to the amount of lateral movement. The sideslip measurement assembly also includes first and second switches disposed along one of the runways, the switches being spaced apart along the runway. Each switch is actuated by the passage of a vehicle tire thereby so that passage of the vehicle over the sideslip measurement assembly causes first one and then the other of the switches to be actuated by passage of a tire of the vehicle thereover. An indicator displays information concerning lateral movement of the measurement plate as measured by the lateral movement sensor means. Control circuitry, operatively connected to the first and second switches and responsive to actuation thereof, determines from the actuations of the first and second switches whether the latest output of the lateral movement sensor corresponds to the front or rear tires of the vehicle.

In a third aspect of the present invention, a sideslip meter for detecting sideslip in a vehicle includes a sideslip measurement assembly having first and second generally parallel, spaced apart runways over which a vehicle may be driven. The first runway has a measurement plate movable laterally with respect to the longitudinal axis of the first runway as a tire of the vehicle passes over the measurement plate. The measurement plate moves laterally as a result of lateral forces acting upon the tire. A lateral movement sensor operatively connected to the measurement plate senses the amount of lateral movement of the measurement plate as a vehicle tire passes over the plate and provides an output signal corresponding to that amount of lateral movement. The lateral movement sensor includes a linear-to-rotary converter for mechanically converting linear motion of the measurement plate to rotary motion and a transducer for electronically converting the rotary motion to a digital signal. An indicator or display displays information concerning lateral movement of the measurement plate as measured by the lateral movement sensor. Control circuitry, responsive to the digital signal from the transducer, determines the sideslip of the tire from that signal and controls the indicator to display the sideslip.

BRIEF DESCRIPTION OF THE DRAWINGS

Similar reference characters indicate similar parts throughout the several views of the drawings.

DESCRIPTION OF THE PREFERRED EMBODIMENT

Figure 1:
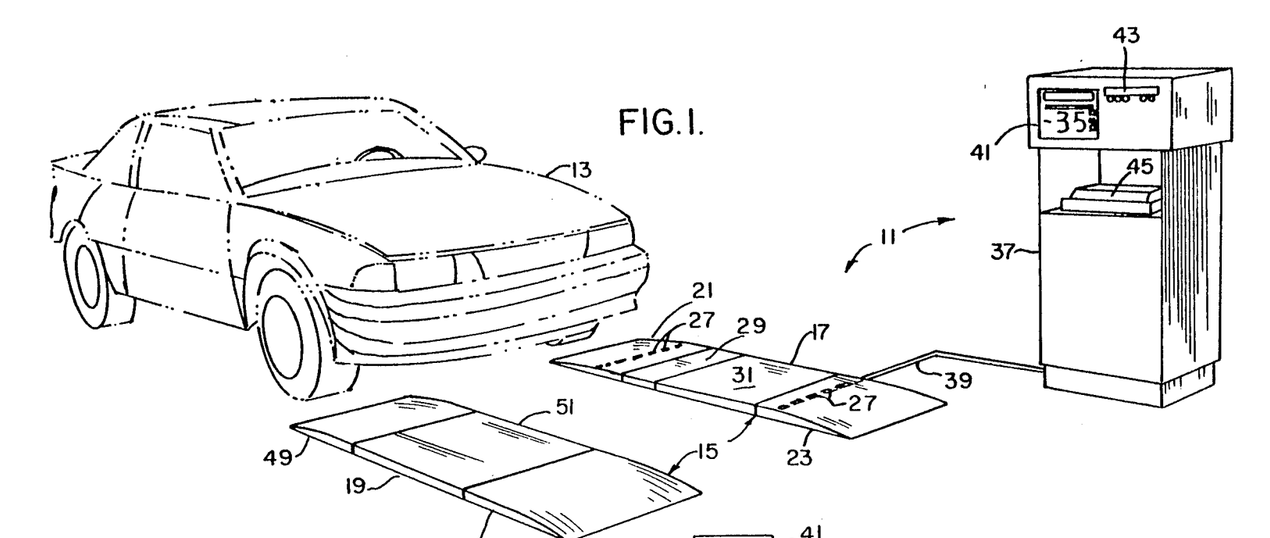
FIG. 1 is a perspective view of the sideslip meter of the present invention with a vehicle about to drive over the sideslip measurement assembly.

Turning to the drawings, a sideslip meter 11 of the present invention is used to detect and measure sideslip in a vehicle, such as the vehicle labelled 13 in FIG. 1. Meter 11 includes a sideslip measurement assembly 15 having a first runway 17 and a second runway 19. These runways are generally parallel and are spaced apart so that any number of different vehicles may be driven over them. By way of reference, each runway is preferably twenty-six inches wide and seventy-seven inches long with a distance of thirty-seven inches between the runways. These distances are illustrative only. By suitably selecting these distances one can accommodate a wide variety of vehicle makes and models on the same two runways 17 and 19.

Runways 17 and 19 are less than two inches high and are made of galvanized steel. They are suitably bolted to the floor (not shown) to hold them in place. Although the runways have the same dimensions, they are not identical.

Runway 17 has a pair of ramps 21 and 23, each of which has associated therewith a separate switch 25 (see FIG. 3) which provides vehicle position information for the meter. The actuators 27 for switches 25 can be seen in FIG. 1. As each tire on the driver's side of vehicle 13 passes over ramp 21 it actuates the switch 25 associated with that ramp. By way of illustration, each ramp is twenty-six inches wide and twenty-three and one-quarter inches long.

Figure 6:
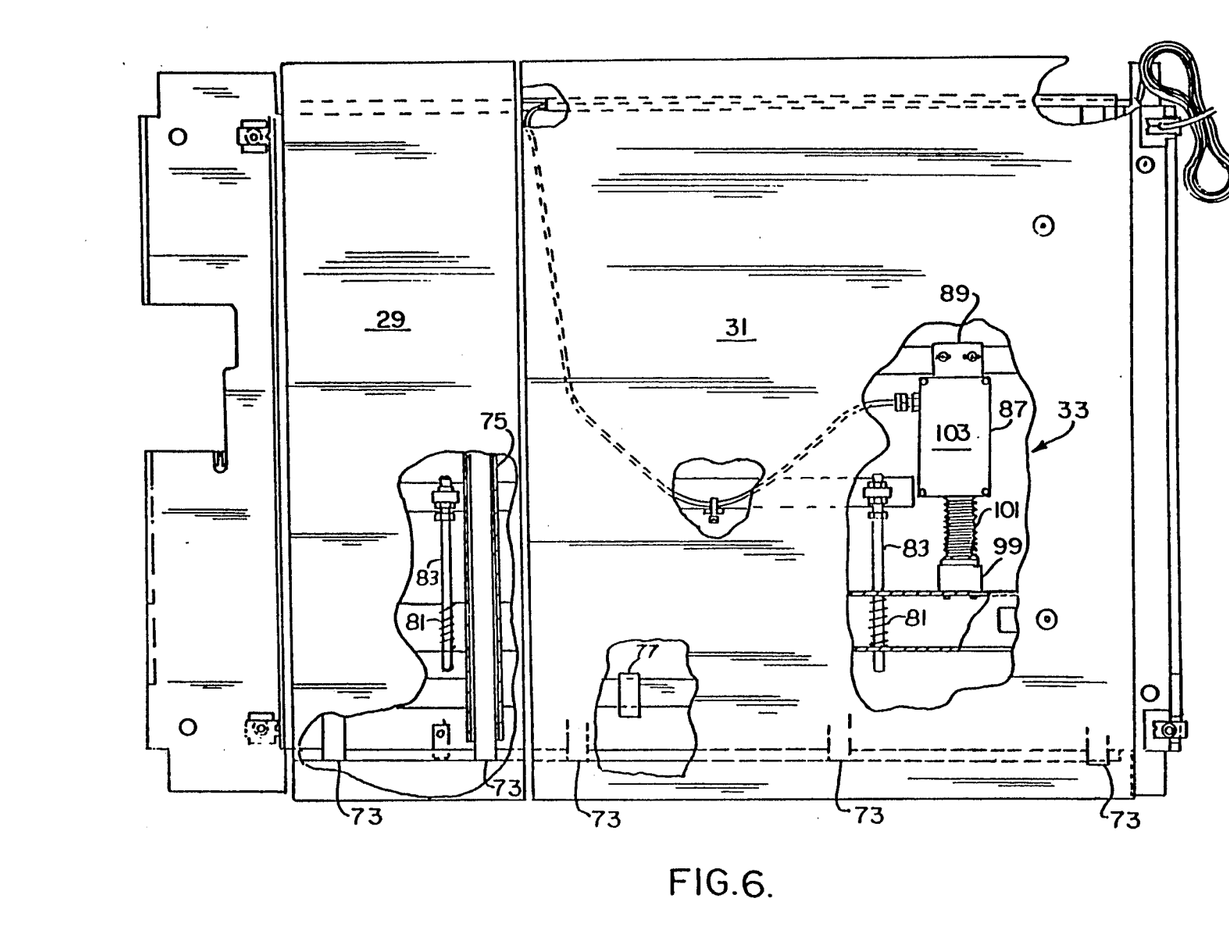
FIG. 6 is a top plan, with parts broken away for clarity, of the compensation plate and the measurement plate of the meter of FIG. 1.

After passing over ramp 21 and the associated switch actuator 27, the front tire of vehicle 13 passes over a compensation plate 29 (see FIG. 6 for details). Compensation plate 29 is movable laterally with respect to the longitudinal axis of the first runway. If the front tire of vehicle 13 has any built-up lateral tire forces acting on it, these are removed by compensation plate 29. (Similarly, the compensation plate will remove built-up lateral tire forces acting on the rear tire as well).

After the compensation plate, the front tire of vehicle 13 passes over a measurement plate 31. Measurement plate 31 is also movable laterally with respect to the longitudinal axis of the runway 17. However, since all built-up lateral tire forces have been removed by compensation plate 29 and since compensation plate 29 and measurement plate 31 move independently, only the residual sideslip forces remain to be measured by measurement plate 31. As a tire of vehicle 13 passes over the measurement plate, measurement plate 31 is moved laterally as a result of any remaining lateral forces acting upon the tire.

Figure 7:
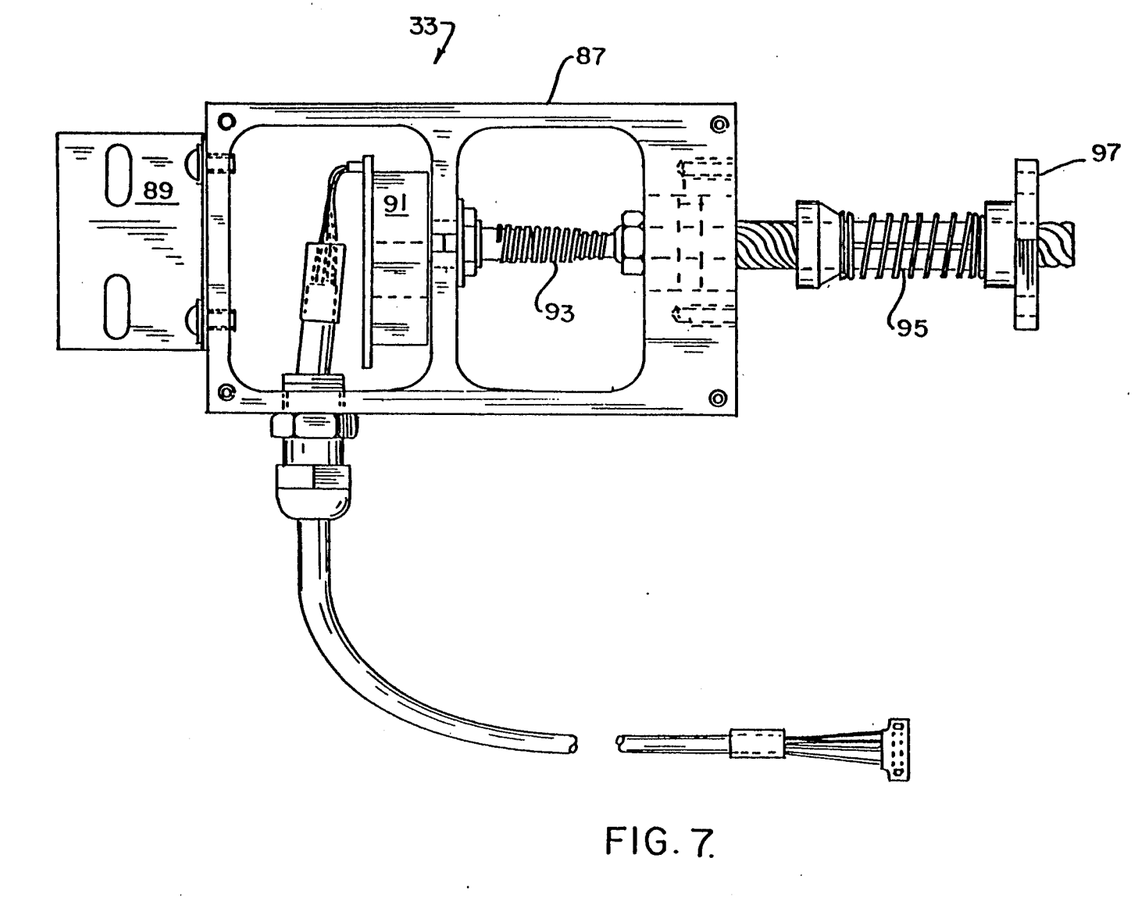
FIG. 7 is an enlarged view of a transducer assembly of the meter of FIG. 1 with parts removed for clarity.

As is explained in detail below in connection with FIGS. 6 and 7, measurement plate 31 is connected to a transducer assembly 33 which senses the amount of lateral movement of the measurement plate as a vehicle tire passes over the plate. The transducer assembly provides an output signal corresponding to the amount of lateral movement of measurement plate 31 to a microprocessor based control circuit 35 (FIG. 2) disposed in a console 37 (FIG. 1). A metal conduit 39 is provided to carry the cables from transducer 33 and switches 25 to microprocessor based control circuit 35.

After passing over the measurement plate, the front tire of vehicle 13 actuates switch 25 of second ramp 23 and then goes down the ramp and off the sideslip measurement assembly. If it is desired to measure sideslip of the rear wheels as well, the vehicle is driven further over sideslip measurement assembly 15 so that the driver's side rear wheel passes over the various parts of runway 17.

Console 37 includes not only microprocessor based control circuit 35, but also a display or indicator 41, a touch-key control pad 43, and a printer 45.

Display 41, under control of control circuit 35, displays information concerning lateral movement of measurement plate 31 as measured by lateral movement transducer 33. The display is discussed in detail in connection with FIGS. 10 and 11, below.

Figure 2:
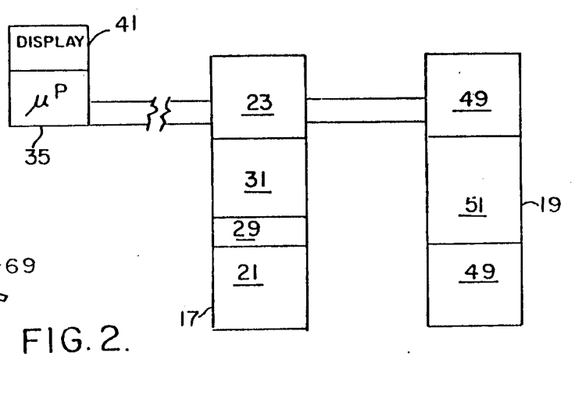
FIG. 2 is a block diagram of the sideslip meter of FIG. 1.

Control circuit 35 receives inputs from first and second switches 25, from measurement plate transducer 33, and from keypad 43. In response, it controls display 41 and printer 45. More specifically, control circuit 35 determines the velocity of vehicle 13 from the time interval between actuation of the two switches 25, it determines the direction of travel of the vehicle from the sequence in which the two switches are actuated, and by keeping track of switch closures determines whether the sideslip of the front axle or rear axle is being measured.

The sideslip measurement should be taken at a walking speed. Velocities which are too fast or too slow can lead to error. Control circuit 35 has a conventional timer so that computing the time interval between switch actuations is relatively trivial. It computes the vehicle velocity based upon the measured time interval and compares the actual velocity with preset values of velocity to determine if the vehicle velocity is acceptable. These preset velocity values are stored either in the program which controls circuit 35 or in its memory so that the comparison can readily be made. If the velocity is acceptable, control circuit 35 takes the output signal from transducer 33 and from it computes the sideslip value (in units of feet/mile or meters/kilometer as selected at keypad 43 by the user) and supplies that value to display 41.

When the velocity is too slow, control circuit 35 causes a red indicator light on display 41 to light up, indicating to the user that the test should be done again at a slightly higher speed. Similarly, if the velocity is too fast, a second red indicator light on display 41 lights up, indicating to the user that the test should be repeated at a slower speed. In either event, no display of a measured sideslip value is made by display 41 when the velocity is either too fast or too slow. Control circuit 35 inhibits this display by not sending the measurement information to display 41.

Unlike runway 17, runway 19 is fixed in position. It has two ramps 49 on either side of a spacer plate 51. Neither the ramps 49 nor the spacer plate 51 are movable. As a result, all the lateral forces acting upon both tires of an axle act upon the laterally movable measurement plate 31 of runway 17.

Figure 3:
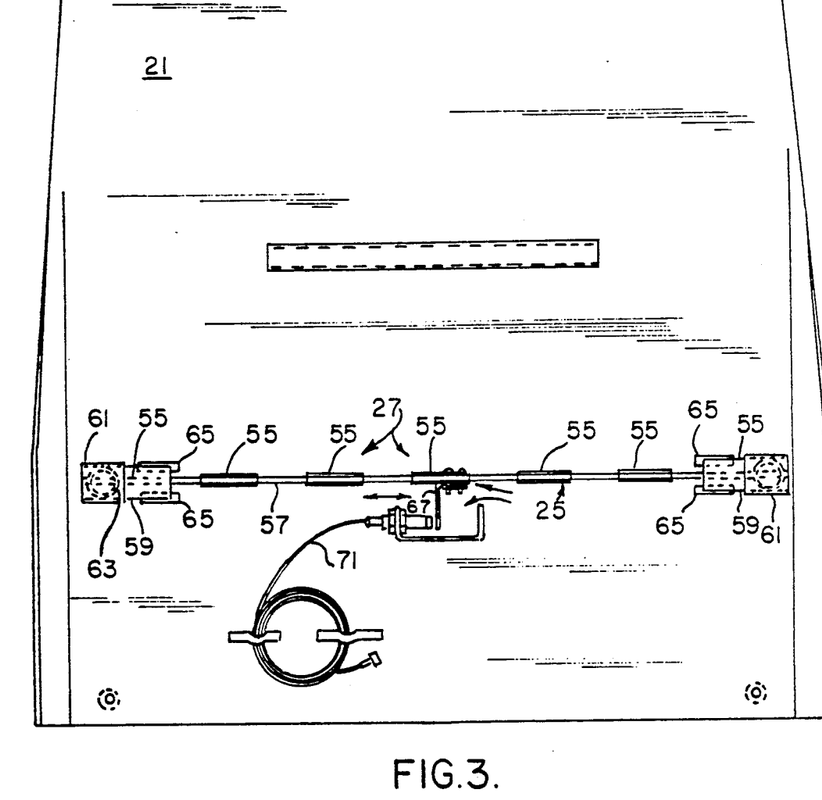
FIG. 3 is a bottom view of the a ramp of the meter of FIG. 1 illustrating the vehicle position sensing switches.
Figures 4, 5:
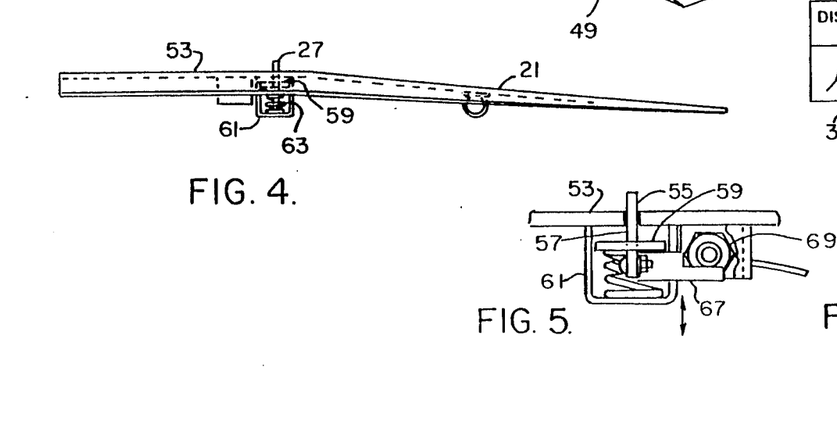
FIG. 4 is a side elevation of the ramp of FIG. 3.
FIG. 5 is an enlarged sectional view illustrating the switching action of the vehicle position sensing switches.

Turning to FIGS. 3–5, the details of ramps 21 and 23 and of switches 25 and switch actuators 27 are illustrated. Each switch actuator 27 (see FIG. 4) extends above the top surface 53 of that runway. As a tire passes by, it depresses the switch actuator. As can be seen from FIGS. 1 and 3, each switch actuator has a plurality of teeth 55 which extend upwardly through corresponding holes in the top surface 53 of the ramp. The teeth are integrally formed with and extend upwardly from a blade 57 which is fixedly secured to a pair of plates 59 at each end.

Each plate 59 extends into its respective housing 61 which confines a coil spring 63 between plate 59 and the housing. Coil springs 63 (one in each housing) constitute biassing means for biassing their corresponding switch actuator to the undepressed position. Housing 61 also functions to constrain motion of the switch actuators to a generally vertical plane. In the undepressed position, plates 59 rest on pairs of ridges 65 which also function to keep blade 57 from tilting as it is depressed by the passage of a vehicle tire.

As can be seen from FIGS. 1 and 3, the teeth 55 of each switch actuator extend generally across the entire width of runway 17. With this configuration, no matter what portion of the runway the vehicle tire passes over, it will depress switch actuator 27.

Each switch actuator carries a vane 67 which moves generally vertically when the actuator is depressed by the passage of a tire. As can best be seen in FIG. 5, each vane 67 is generally L-shaped with a finger which extends outwardly from blade 57 (to which vane 67 is suitably secured) to the vicinity of a proximity sensor 69. Proximity sensor 69 may be any of a number of conventional sensors such as Model NI5-G12-AN7X sold by Turck, Inc. of Minneapolis, Minn.

Each switch 25 includes a proximity sensor 69, and the output of that sensor is the electrical output of the corresponding switch.

In FIG. 5, tooth 25 is depressed sufficiently to move vane 67 downwardly away from the proximity sensor 69. With this particular proximity sensor and vane, one-eighth inch of travel of the tooth immediately above the vane is sufficient to be detected by the proximity sensor. It should be realized that the vehicle tire will not necessarily depress this particular tooth completely. If, for example, the tire is at one side of the ramp or the other as it crosses switch actuator 27, the center tooth will be depressed only partially, such as is shown in FIG. 5. Of course, the closer the tire is to the center of the ramp, the more fully the center tooth will be depressed and the farther away the vane will travel from proximity sensor 69.

Sensor 69 is connected to control circuit 35 by means of a suitable cable such as cable 71 so that switch closure information can be transmitted to the control circuit.

Turning to FIG. 6, compensation plate 29 and measurement plate 31 both are confined to move only perpendicularly to the runway. This is accomplished by a series of fixed tracks 73 (only portions of which are shown) on which ride inverted channels such as the portion of channel 75 shown in connection with compensation plate 29. Each plate also includes a set of stops, such as those shown in FIGS. 8 and 9 for limiting the amount of lateral movement of their respective plates to a preset maximum amount to protect the components of the meter.

Figure 8:
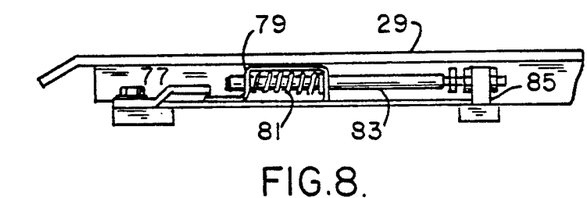
FIGS. 8 and 9 are side views illustrating various stops used with the plates of FIG. 6.

For example, FIG. 8 illustrates the stop 77 for compensation plate 29. Stop 77 is fixedly secured to the floor. When the compensation plate reaches its maximum allowable deflection, stop 77 is engaged by an inverted channel 79 fixedly secured to movable compensation plate 29.

Also illustrated in FIG. 8 is part of the centering mechanism for compensation plate 29 which is used to keep the plate centered between tests and to provide a preset resistance to movement of the compensation plate during a test. This centering mechanism includes a coil spring 81 disposed in inverted channel 79, said spring surrounding and being secured (at its rightmost end) to a rod 83.

Between tests, rod 83 is in the position shown in FIG. 8, abutting a second stop 85. Spring 81 is preloaded by confinement in the inverted channel, but no additional load is imposed on spring 81 by rod 83 and no clearance exists between rod 83 and stop 85. If compensation plate 29 is moved to the right during the test, rod 83 remains abutting stop 85 and spring 81 compresses. When the forces are released, the spring causes plate 29 to reassume the position shown in FIG. 8. If, on the other hand, compensation plate 29 is moved to the left during the test, rod 83 is simply carried away from stop 85. Plate 29 is returned to the rest position in this instance by another, identical centering mechanism secured to the other side of compensation plate 29.

As can be seen from FIG. 6, measurement plate 31 has a similar centering mechanism. The measurement plate centering mechanisms constitute means for biassing the measurement plate to a predetermined position at which there is no unbalanced lateral load on the measurement plate.

Figure 9:
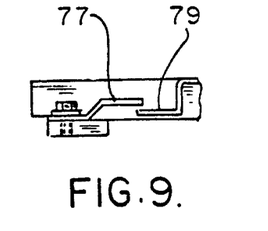

It is also preferred that there be four stops for measurement plate 31, such as the stop illustrated in FIG. 9. As can be seen, this stop works in a similar fashion to that of FIG. 8.

Compensation plate 29 merely relieves built-up lateral tire forces before the tire reaches measurement plate 31. It provides no signal to control circuit 35. This should be contrasted with measurement plate 31, which does provide a signal to the control circuit Transducer assembly 33, described above, translates the linear motion of the measurement plate to a rotary motion and then converts that rotary motion to a digital signal.

More specifically, transducer assembly 33 (FIGS. 6 and 7) includes a housing 87 secured by means of a bracket 89 to an immovable portion of the chassis of the runway. Housing 87 includes a rotary motion to digital transducer 91, such as the Type 601-128-C24 type transducer sold by Clarostat Manufacturing Company, Inc. of Dover, N.H. Transducer 91 is coupled by a coiled spring coupling 93, to allow for any misalignment, to a precision ball screw 95 which rides on a nut 97 which is fixedly secured to measurement plate 31 by means of a spacer 99. In use ball screw 95 is protected by a boot 101 and the openings in housing 87 shown in FIG. 7 are covered by a plate 103.

In use, linear movement of the measurement plate is converted by nut 97 and ball screw 95 into rotary motion. That is, when nut 97 fixedly moves with the measurement plate, it causes ball screw 95 to rotate. The rotary motion of ball screw 95 is transmitted to transducer 91 by spring coupling 93 and transducer 91 thereupon transmits a digital signal to control circuit 35 which corresponds to the linear motion of the measurement plate. This digital signal may be stored in a register or periodically sampled by the control circuit as dictated by the particular control circuit being used.

Figure 10:
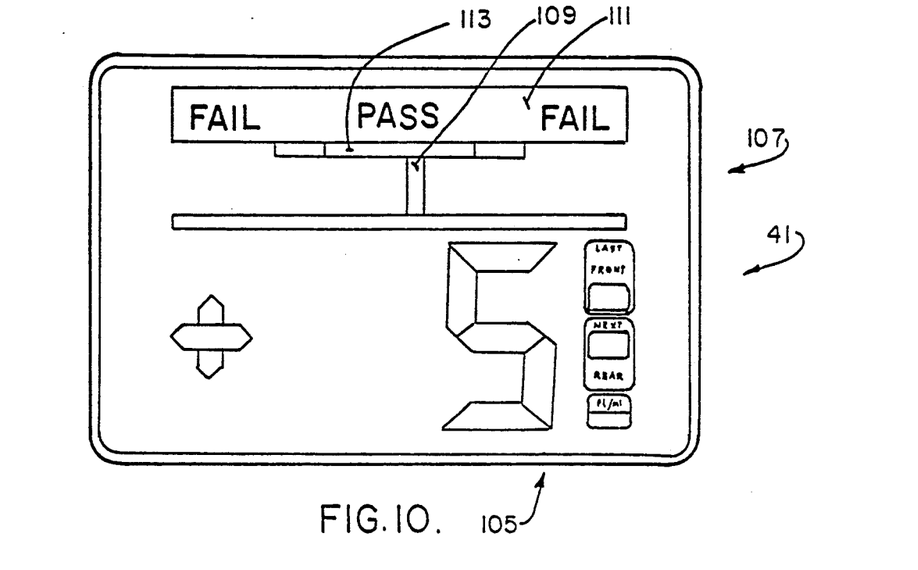
FIGS. 10 and 11 are elevations of a display used with the meter of FIG. 1.
Figure 11:
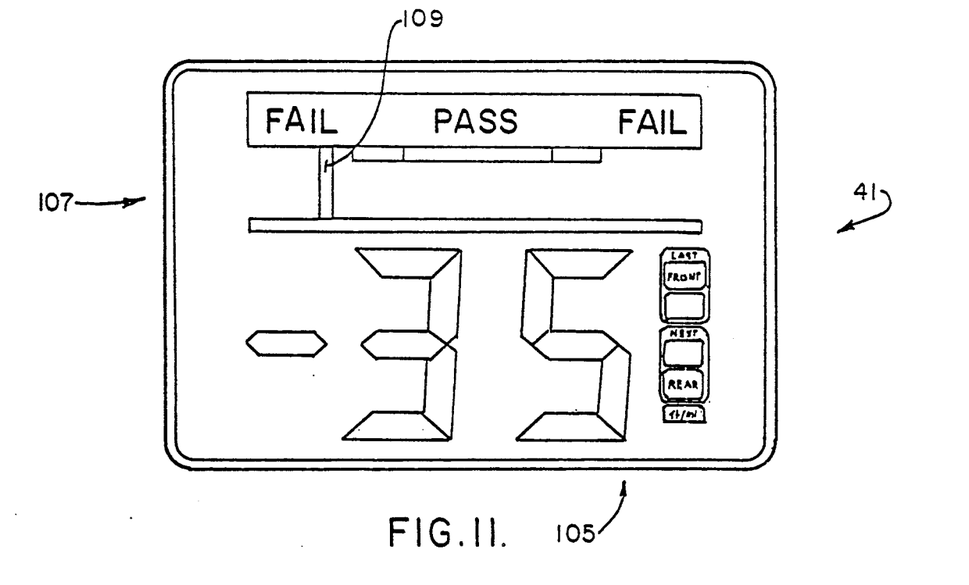

Turning to FIGS. 10 and 11, display 41 is seen to have both a numeric display 105 for visually displaying in numeric form the sideslip value measured by the measurement plate and a bar display 107 for providing a non-numeric indication of whether the measured sideslip falls within acceptable limits. The numeric display is standard, except for the fact that the numerals are four inches tall, which enables the user to read the display while still seated in the vehicle under test.

The bar display includes the bar 109 itself which is positioned by the control circuit in the appropriate position corresponding to the numeric reading, a legend strip 111 which indicates immediately to the user whether or not the measured value is acceptable or not (because of the Pass/Fail notations), and a three-part "Pass" bar 113 which enables the user to visually distinguish between readings which are fully acceptable and those which are marginal.

Control circuit 35 includes in memory or in the controlling program itself sets or ranges of predetermined sideslip data. The control circuit compares each sideslip measurement with the predetermined sideslip data to determine whether the measured value is acceptable, marginal, or unacceptable. It then controls bar display 107 accordingly.

As mentioned above, keypad 43 is used to start the test and to set the mode of the apparatus. The control circuit has three modes of operation. It the first mode it measures the sideslip of the tires on both the front and the rear axles. In the second it measures the sideslip only of the tires on the front axle. In the third mode the control circuit is not responsive to actuation of the first and second switches at all. Instead it just waits for a predetermined amount of time and then displays the largest value of sideslip detected during that test.

In view of the above it will be seen that the various objects and features of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A sideslip meter for detecting sideslip in a vehicle, comprising:
   a sideslip measurement assembly having first and second generally parallel, spaced apart runways over which a vehicle may be driven;
   the first runway having a measurement plate movable laterally with respect to the longitudinal axis of the first runway as a tire of said vehicle passes over the measurement plate, said measurement plate being moved laterally as a result of lateral forces acting upon said tire;
   lateral movement sensor means operatively connected to the measurement plate for sensing the amount of lateral movement of the measurement plate as a vehicle tire passes over said plate and for providing an output signal corresponding to said amount of lateral movement;
   said sideslip measurement assembly also including first and second switches disposed along one of the runways, said switches being spaced apart along said runway, each switch being actuated by the passage of a vehicle tire thereby so that passage of the vehicle over the sideslip measurement assembly causes first one and then the other of the switches to be actuated by passage of a tire of the vehicle thereover;
   indicator means for displaying information concerning lateral movement of the measurement plate as measured by the lateral movement sensor means; and
   control means, operatively connected to the first and second switches and responsive to actuation thereof, for determining a controlled parameter of the vehicle, from the actuations of the first and second switches, for comparing the value of the controlled parameter with preset values to determine if the value of the controlled parameter is acceptable, and for inhibiting display of the lateral movement information by the indicator means if the value of the controlled parameter is unacceptable.

2. The sideslip meter as set forth in claim 1 wherein the second runway is fixed in position so that all the lateral forces acting upon both tires of an axle act upon the laterally movable measurement plate.

3. The sideslip meter as set forth in claim 1 wherein the sideslip measurement assembly has a preferred direction in which the vehicle to be tested is driven along the runways, and wherein the first runway includes a compensation plate disposed before the measurement plate along the preferred direction, said compensation plate being movable laterally with respect to the longitudinal axis of the first runway as a tire of said vehicle passes over the compensation plate to remove any built-up lateral tire forces before the tire passes over the measurement plate, said compensation plate being movable independently of the measurement plate.

4. The sideslip meter as set forth in claim 1 wherein the sideslip measurement assembly includes means for confining movement of the measurement plate to a direction generally perpendicular to the runways.

5. The sideslip meter as set forth in claim 1 wherein the sideslip measurement assembly includes means for mechanically limiting the amount of lateral movement of the measurement plate to a preset maximum amount 6. The sideslip meter as set forth in claim 1 wherein the lateral movement sensor means includes linear-to-rotary converting means for mechanically converting linear motion of the measurement plate to rotary motion and a transducer for electronically converting the rotary motion to a digital signal.

7. The sideslip meter as set forth in claim 6 wherein the linear-to-rotary converting means includes a screw and a nut threadedly engaged therewith, one of which is fixedly connected to the measurement plate for linear movement therewith, the other being free to rotate in response.

8. The sideslip meter as set forth in claim 6 wherein the lateral movement sensor means includes a coil-spring coupling mechanically connecting the linear-to-rotary converting means with the transducer.

9. The sideslip meter as set forth in claim 1 wherein the first and second switches include first and second mechanical switch actuators respectively disposed along one of the runways, said switch actuators being spaced apart along said runway, each switch actuator being movable by the passage of a vehicle tire thereover so as to actuate the corresponding switch.

10. The sideslip meter as set forth in claim 9 wherein the first and second switch actuators extend above the top surface of said runway and are depressed by passage of a tire thereacross.

11. The sideslip meter as set forth in claim 10 wherein the switches each include biassing means for biassing the switch actuators to the undepressed position.

12. The sideslip meter as set forth in claim 10 wherein the first and second switches include means for constraining motion of the switch actuators to a generally vertical plane.

13. The sideslip meter as set forth in claim 9 wherein the first and second switch actuators are disposed along the first runway on opposite sides of the measurement plate.

14. The sideslip meter as set forth in claim 9 wherein each switch actuator extends generally across the entire width of said runway.

15. The sideslip meter as set forth in claim 9 wherein each switch actuator carries a vane which moves generally vertically when the actuator is moved by the passage of a tire, each switch including a proximity sensor for sensing the location of its associated vane 16. The sideslip meter as set forth in claim 15 wherein the proximity sensor is disposed such that movement of the corresponding switch actuator by a tire moves the corresponding vane away from the proximity sensor.

17. The sideslip meter as set forth in claim 1 wherein the control means is responsive to actuation of the first switch followed by actuation of the second switch to enable display of the measured movement of the measurement plate and is responsive to actuation of the second switch followed by actuation of the first switch to inhibit display of the measured movement of the measurement plate.

18. The sideslip meter as set forth in claim 1 wherein the controlled parameter is the velocity of the vehicle, the control means having means for determining the time interval between actuation of the first switch and actuation of the second switch, said control means thereby calculating the velocity of the vehicle.

19. The sideslip meter as set forth in claim 18 wherein the control means includes means for storing a preset range of acceptable vehicle velocities, said control means comparing the velocity of the vehicle with the preset range of velocities and enabling display of the measured movement of the measurement plate when the velocity of the vehicle falls within the preset range and inhibiting display of the measured movement of the measurement plate when the velocity falls outside the preset range.

20. The sideslip meter as set forth in claim 19 further including means for visually signaling to the user of the sideslip meter that the velocity of the vehicle falls outside the preset range.

21. The sideslip meter as set forth in claim 20 wherein the visual signaling means includes first display means for visually signaling to the user that the velocity of the vehicle was too slow and second display means for visually signaling to the user that the velocity of the vehicle was too fast.

22. The sideslip meter as set forth in claim 1 wherein the sideslip measurement assembly includes means for biassing the measurement plate to a predetermined position at which there is no unbalanced lateral load on the measurement plate.

23. The sideslip meter as set forth in claim 1 wherein the indicator means includes a numeric display for visually displaying in numeric form the sideslip value measured by the measurement plate and a bar display for providing a non-numeric indication of whether the measured sideslip falls within acceptable limits.

24. The sideslip meter as set forth in claim 23 wherein the control means includes means for storing sets of predetermined sideslip data, said control means being response to a sideslip measurement to compare that measured value with the predetermined sideslip data to determine whether the measured value is acceptable, marginal, or unacceptable.

25. The sideslip meter as set forth in claim 24 wherein the bar display of the indicator means includes means responsive to the control means to non-numerically display whether the measured sideslip value is acceptable, marginal, or unacceptable.

26. The sideslip meter as set forth in claim 1 wherein the indicator means includes a numeric display for displaying the measured sideslip value, the digits of the numeric display being at least approximately four inches in height.

27. The sideslip meter as set forth in claim 1 further including means for manually setting the mode of the control means, the control means having a first mode in which it measures the sideslip of the tires on both the front and the rear axles and a second mode in which it measures the sideslip only of the tires on the front axle.

28. The sideslip meter as set forth in claim 27 wherein the control means has a third mode in which it is not responsive to actuation of the first and second switches, further including means for manually setting the control means in the third mode.

29. A sideslip meter for detecting sideslip in a vehicle, comprising:
- a sideslip measurement assembly having first and second generally parallel, spaced apart runways over which a vehicle may be driven;
- the first runway having a measurement plate movable laterally with respect to the longitudinal axis of the first runway as a tire of said vehicle passes over the measurement plate, said measurement plate being moved laterally as a result of lateral forces acting upon said tire;
- lateral movement sensor means operatively connected to the measurement plate for sensing the amount of lateral movement of the measurement plate as a vehicle tire passes over said plate and for providing an output signal corresponding to said amount of lateral movement;
- said sideslip measurement assembly also including first and second switches disposed along one of the runways, said switches being spaced apart along said runway, each switch being actuated by the passage of a vehicle tire thereby so that passage of the vehicle over the sideslip measurement assembly causes first one and then the other of the switches to be actuated by passage of a tire of the vehicle thereover;
- indicator means for displaying information concerning lateral movement of the measurement plate as measured by the lateral movement sensor means; and
- control means, operatively connected to the first and second switches and responsive to actuation thereof, for determining from the actuations of the first and second switches whether the latest o of the lateral movement sensor means corresponds to the front or rear tires of the vehicle.

30. The sideslip meter as set forth in claim 29 wherein the control means is responsive to actuation of the first switch followed by actuation of the second switch to enable display of the measured movement of the measurement plate and being responsive to actuation of the second switch followed by actuation of the first switch to inhibit display of the measured movement of the measurement plate.

31. The sideslip meter as set forth in claim 29 wherein the indicator means includes a numeric display for visually displaying in numeric form the sideslip value measured by the measurement plate and a bar display for providing a non-numeric indication of whether the measured sideslip falls within acceptable limits.

32. The sideslip meter as set forth in claim 31 wherein the control means includes means for storing sets of predetermined sideslip data, said control means being response to a sideslip measurement to compare that measured value with the predetermined sideslip data to determine whether the measured value is acceptable, marginal, or unacceptable.

33. The sideslip meter as set forth in claim 32 wherein the bar display of the indicator means includes means responsive to the control means to non-numerically display whether the measured sideslip value is acceptable, marginal, or unacceptable.

34. The sideslip meter as set forth in claim 29 further including means for manually setting the mode of the control means, the control means having a first mode in which it measures the sideslip of the tires on both the front and the rear axles and a second mode in which it measures the sideslip only of the tires on the front axle.

35. The sideslip meter as set forth in claim 34 wherein the control means has a third mode in which it is not responsive to actuation of the first and second switches, further including means for manually setting the control means in the third mode.

* * * * *